United States Patent Office 3,287,410
Patented Nov. 22, 1966

3,287,410
METHOD OF PREPARING ALIPHATIC AMINES
Zdzislaw W. Dudzinski, Hasbrouck Heights, N.J., and Reginald L. Wakeman, Philadelphia, Pa., assignors, by mesne assignments, to Millmaster Onyx Corporation, New York, N.Y., a corporation of New York
No Drawing. Filed Apr. 22, 1963, Ser. No. 274,801
8 Claims. (Cl. 260—583)

The present invention relates to a process for the preparation of aliphatic amines from sulfates of secondary straight-chain aliphatic alcohols in which the alcohol group is linked to the penultimate carbon atom and to the corresponding amines so produced.

An object of the present invention is to provide a process for the ready manufacture of primary amines by reaction of ammonia with the ammonium salts of the heretofore stated sulfuric acid esters. It is a further object of this invention to provide a method for the easy manufacture of secondary amines from salts of the aforesaid sulfuric acid esters and primary amines. It is still another object of the present invention to provide an economical method for the production of tertiary amines by reaction of salts of the aforesaid sulfuric acid esters and secondary amines with additional secondary amine.

It is, moreover, a further object of this invention to provide a method for obtaining primary, secondary or tertiary amines by reaction of ammonia, a primary amine or a secondary amine, respectively, with sulfation products derived from alpha olefins.

Alpha olefins are currently commercially available chemical raw materials which are produced either by cracking essentially straight-chain paraffinic hydrocarbons or by a Ziegler type synthesis by polymerization of ethylene. It is an object of the present invention to provide a means for converting hydrocarbons of this nature which contain from 8 to 34 carbon atoms to primary, secondary and tertiary amines.

In carrying out the method of this invention, the acid sulfate of a secondary aliphatic alcohol containing from 8 to 34 carbon atoms, having a straight chain, and having a hydroxyl group linked to the second carbon atom is neutralized with ammonia, or with a primary amine containing from 1 to 34 carbon atoms, or with a secondary amine containing two alkyl radicals, each of which may possess from 1 to 34 carbon atoms, and mixtures of same if desired. The acid sulfate of the secondary alcohol may be prepared by any of the well known procedures for making such compounds. For example, a secondary alcohol may be reacted with chloro sulfonic acid, sulfuric acid or $SO_3$. Where the ammonium salt is the product desired, a secondary alcohol may be reacted with sulfamic acid in order to obtain the ammonium salt directly. We prefer, however, to prepare the acid sulfate by sulfation of an alpha olefin, this reaction being carried out by procedures well known in the art, to add sulfuric acid across the double bond. Such addition is preferably carried out at relatively low temperatures, that is to say, at a temperature not exceeding 0° C. or below. After sulfation of the secondary aliphatic alcohol or the olefin and neutralization with ammonia or a primary or secondary amine, the salt of the sulfation product is mixed with an excess of the same amine (or ammonia) and the mixture is then reacted for several hours in a stirring autoclave at a temperature above 100° C., preferably below 250° C. We prefer to use temperatures in the range of 150 to 160° C. At this latter temperature range, approximately 50% of the theoretical yield of amine is formed after reaction from 10 to 15 hours.

The final reaction for making tertiary amines may be generalized as follows:

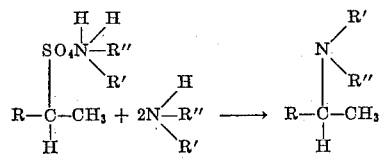

where R is a straight-chain aliphatic radical containing from 6 to 32 carbon atoms and where R' and R" may be either hydrogen or an alkyl radical containing from 1 to 34 carbon atoms.

The method of carrying out the process of this invention will become more specifically apparent from the following examples:

Example I 880 grams of 98% sulfuric acid were cooled to minus 5° C. and added to 1344 grams of alpha dodecene, cooled to the same temperature. Addition was carried out over a 15-minute period while maintaining the temperature at minus 5° C. The sulfated material was neutralized with dimethyl amine by adding it to the theoretical amount of aqueous 40% dimethyl amine.

Example II 960 grams of alpha octene were sulfated with 880 grams of 98% sulfuric acid as in Example I. After sulfation, the reaction mixture was brought to a pH of 7 by addition of dimethyl amine.

Example III (a) 1800 grams of alpha tetradecene were sulfated with 900 grams of concentrated sulfuric acid (98%) and the product was neutralized with diethyl amine. (b) 1100 grams of cetene obtained by pyrolysis of spermaceti were sulfated with 450 grams of 98% sulfuric acid and the product neutralized with dibutyl amine. (c) 1000 grams of alpha tetratriacontene were sulfated with 150 grams of 98% sulfuric acid and the product neutralized with dimethyl amine.

Example IV

Alpha dodecene was sulfated in the manner of Example I and the product neutralized with concentrated ammonium hydroxide.

Example V

Dodecanol-2 was reacted with an equimolar amount of sulfamic acid while heating with stirring to 100% C. The product was the ammonium salt of the sulfuric acid ester of dodecanol-2.

Example VI 176 grams of dodecanol-2 were reacted with 116.5 grams of chlorosulfonic acid at a temperature of 35° C. Reaction was carried out with stirring under a slight vacuum to remove the hydrochloric acid generated during reaction. After completion of sulfation, the product was neutralized with dimethyl amine.

Example VII 1000 grams of decene-1 were sulfated in the manner of Example I and the product neutralized with methyl amine.

Example VIII 1344 grams of dodecene-1 were sulfated as in Example I with 880 grams of 98% sulfuric acid and the product neutralized with methyl amine.

Example IX

The ammonium and amine salts of each of the preceding examples were reacted separately with the same amine used in their preparation, 4.4 mols of amine being added to 1 mol of the amine or ammonium salt adjusted to approximately 30% concentration in these preparations. Concentrated ammonium hydroxide was used in treating the ammonium salts of Examples IV and V. A 40% aqueous solution of dimethyl amine was employed where the salts were derived from dimethyl amine and the other amines were used in the form of 100% active materials.

The reaction mixture was placed in a stainless steel stirring autoclave and heated for 13 hours at a pot temperature of 150 to 160° C. The internal pot pressures varied with the vapor pressure of the amine used. In the case of dimethyl amine, for example, the pressure was usually in the order of 100 lbs./sq. inch.

After 13 hours of reaction the autoclave was cooled and in each case the product separated into two layers. The top layer containing the amine was washed with water, extracted with ether and the ether evaporated. The residue was then vacuum distilled.

By carrying out the reaction as here described, the following amines designated product No. (1) to (8), were obtained, respectively, from the reaction product of Examples I to VIII. All of these products were light colored liquids with the exception of those containing 18 or more carbon atoms in the principal chain. Those containing 18 or more carbon atoms were solids.

(1) 2-dimethylamino dodecane
(2) 2-dimethylamino octane
(3)(a) 2-diethylaminotetradecane
(3)(b) 2-dibutylaminohexadecane
(3)(c) 2-dimethylaminotetratricontane
(4) 2-amino dodecane
(5) 2-amino dodecane
(6) 2-dimethylamino dodecane
(7) 2-methylamino decane
(8) 2-methylamino dodecane The primary, secondary and tertiary amines of this invention are useful components of corrosion inhibitors in amounts from 1 to 10%. They may be employed in the form of their hydrochlorides or acetates as ore flotation agents. The secondary amines of this invention are useful intermediates for the preparation of amphoteric surface active agents. They may, for example, be reacted with chloro acetic acid, propane sultone or 1-chlor-2-hydroxy propane-3-sodium sulfonate to give surface active materials containing both a tertiary amino group and an ionic group, i.e., carboxyl or sulfonate. The tertiary amines of this invention may be reacted with benzyl chloride or with alkylated benzyl chlorides containing from 1 to 4 carbon atoms attached to the benzyl ring or with dichlor benzyl chloride in order to obtain useful quaternary ammonium germicides. They may also be reacted with chloro acetic acid in order to form betaines having amphoteric surface active properties.

We claim:

1. The method of making amines which comprises the steps of sulfating an alpha olefin and neutralizing the sulfated olefin with a base selected from the group consisting of ammonia, primary amines and secondary amines, and then reacting the resulting product with an excess of the selected base under heat and pressure to produce an amine having N directly linked to the penultimate carbon atom of the starting hydrocarbon.

2. The method as defined in claim 1, wherein the step of sulfating the alpha olefin is carried out at a temperature not exceeding 0° C.

3. The method of making amines which comprises the steps of reacting the acid sulfate of a secondary aliphatic alcohol with a base selected from the group consisting of ammonia, primary amines and secondary amines, and then reacting the resulting product with an excess of the selected base under heat and pressure to produce an amine having N directly linked to the penultimate carbon atom of the starting hydrocarbon.

4. The method of making amines as defined in claim 3, wherein the acid sulfate of the secondary alcohol has 8 to 34 carbon atoms.

5. The method of making amines which comprises the steps of neutralizing an acid sulfate of a secondary aliphatic alcohol having 8 to 34 carbon atoms with a base selected from the group consisting of ammonia, primary amines having 1 to 34 carbon atoms, and secondary amines having two alkyl radicals each having 1 to 34 carbon atoms, and then reacting the neutralized product with an excess of the said selected base to yield an aliphatic amine having N directly linked to the penultimate carbon atom of the starting alcohol.

6. The method of making amines as defined in claim 5, wherein the step sulfating the secondary alcohol is carried out at a temperature not exceeding 0° C.

7. The method of making amines as defined in claim 5, wherein the neutralized product is reacted with an excess of the selected base at a temperature from 150° to 160° C.

8. The method of making amines as defined in claim 5, wherein the neutralized product is reacted with an excess of the selected base at a temperature above 100° C. and not exceeding 250° C.

References Cited by the Examiner

UNITED STATES PATENTS

| | | | |
|---|---|---|---|
| 2,716,134 | 8/1955 | Reynolds et al. | 260—583 XR |
| 2,758,086 | 8/1956 | Stuart et al. | 260—583 |
| 3,070,552 | 12/1962 | Tesoro et al. | 260—584 XR |

FOREIGN PATENTS

| | | |
|---|---|---|
| 780,028 | 4/1935 | France. |
| 874,909 | 4/1953 | Germany. |

OTHER REFERENCES

Noller: "Chemistry of Organic Compounds," W. B. Saunders Co., Philadelphia, Pa. (1951), page 84 and page 91.

Skita et al: Berichte, 66B (1933), page 1409.

CHARLES B. PARKER, *Primary Examiner.*

JOSEPH P. BRUST, *Examiner.*

ANTON H. SUTTO, RICHARD L. RAYMOND,
*Assistant Examiners.*